3,255,168
PROCESS FOR POLYMERIZING OR COPOLYMER‑
IZING ETHYLENICALLY UNSATURATED COM‑
POUNDS USING A COMPLEX ORGANIC BORON
COMPOUND AS A CATALYST
Giancarlo Borsini, Mario Ragazzini, and Umberto Peron, all of Milan, Italy, assignors, by mesne assignments, to Edison, Milan, Italy, a corporation of Italy
No Drawing. Filed Nov. 6, 1961, Ser. No. 150,192
Claims priority, application Italy, Nov. 11, 1960, 639,145
29 Claims. (Cl. 260—89.1)

The present invention relates to a process for polymerizing or copolymerizing ethylenically unsaturated monomers, especially but not exclusively vinyl and vinylidene monomers which comprises a polymerization or copolymerization reaction using a boron-containing catalyst complex, and to the catalyst complex therefor.

It is know that the electronically unsaturated character of the boron atom encourages the formation of co-ordination complexes between its compounds and organic and inorganic molecules having electron donor atoms (e.g. nitrogen, oxygen, sulphur, phosphorus, arsenic, antimony, etc.).

It is also known that, in the formation of these co-ordination complexes, the increase in valency of the boron and the electron donor atoms leads to a weakening of the valency bonds and an increase in the inter-atomic distances. The organic molecules in these complexes are thus strongly activated and exist in an excited and highly reactive state (A. V. Topchieve, S. V. Zavgorodnii, Y. M. Paushkin, Boron Fluoride and Its Compounds as Catalysts, Inorganic Chemistry, page 47, Pergamon Press, 1959).

The catalyst complexes used in accordance with this invention consist of those co-ordination compounds, in which the boron hydrides and alkylboron or arylboron hydrides have an electron-deficient character of the general formula $B_xR_yH_z$, where R represents hydrogen or an alkyl or aryl radical and $x$, $y$ and $z$ are three integers, and are co-ordinated with compounds of electron donor character containing an element of the 5th or 6th group of the Mendeléeff Periodic Table.

It has now been discovered, surprisingly, that ethylenically unsaturated monomers can also be rapidly polymerized or copolymerized with high conversion yields by using as catalysts complexes corresponding to the general formula $B_xR_yH_z \cdot nD$ (where R represents hydrogen or alkyl and D a molecule of a compound of electron donor character, $x$ is an integer equal to or greater than 1, and $y+z$ are equal to $3x$ whilst $n$ is equal to or greater $\tfrac{1}{2}x$) such as, for example, the complexes composed of diborane or of its alkyl derivatives with pyridine, amines, ammonia, arsines, phosphines, ethers, thioethers, tetrahydrofuran and the like.

Such complexes are well known in the literature, e.g.
$B_2H_6 \cdot C_5H_5N$ (JACS 78, 5384(1956)); 79, 2020 (1957);
$BH_3 \cdot (CH_3)_3N$ (JACS 75, 228 (1953)); $B_2H_6 \cdot 2NH_3$(Ber. 56B, 807 (1923)); $B_2H_6 \cdot 2PH_3$ (JACS 62, 717 (1940));
$B_2H_6 \cdot Se(CH_3)_2$ and $B_2H_6 \cdot S—(CH_3)_2$ (J. Inorg. Nuclear Chem. 3, 164 (1956)); $B_2H_6 \cdot C_4H_4O$ and $$B_2H_6 \cdot 2(C_2H_5)_2O$$

(J. Phys. Chem. 62, 870 (1958)).

According to the present invention there is provided a process for polymerizing or copolymerizing monomers having the general formula:

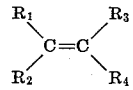

in which $R_1$, $R_2$, $R_3$, $R_4$ are the same or different from one another and are suitably chosen from the following: hydrogen, saturated or non-saturated hydrocarbon radicals, halogen, nitrile group, carboxylic acid, carboxy ester or other acyl containing group, and halogen-substituted hydrocarbon radicals, which comprises a polymerization or copolymerization reaction using a complex organic boron compound as a catalyst, the complex comprising a co-ordination linkage between as first component (a) a boron hydride or a boron alkyl hydride or a boron alkyl hydride, and as second component (b) a compound containing an element of Group V or Group VI of the Periodic Table which is capable of donating electrons to the boron atom to provide the cor-ordination complex compound. Although the process embodying the present invention is applicable to monomers defined above, including ethylene and various derivatives thereof, it is of particular importance when applied to vinyl and vinylidene monomers.

The donor element of the second component (b) may, for example, be nitrogen, oxygen, phosphorus or arsenic. The second component may thus be ammonia or a tertiary aliphatic amine, e.g. triethylamine or a heterocyclic compound containing a teritary nitrogen atom, e.g. pyridine. Alternatively, the second component may be an ether such as a dialkyl ether, for example, diethyl ether; or it may be a heterocyclic compound containing an oxygen atom, e.g. tetrahydrofuran; or the second component may be a ketone, for instance an aliphatic ketone such as acetone.

Thus vinyl chloride may be polymerized according to an embodiment of this invention, using as a catalyst the catalyst complex $B_2H_6 \cdot 2(C_2H_5)_2O$ in n-heptane as a solvent at $-20°$ C.; after 1 hour there is found to be 15% conversion of the monomer, after 3 hours 30% and after 6 hours 70% whilst the yields go down respectively to 5%, 14% and 40% using only $B_2H_6$ in n-heptane as a catalyst.

The activity of the catalyst complexes used in this invention is linked to some extent to the manner in which they are prepared, the type of solvent used in the polymerization and the conditions of polymerization. The temperature of polymerization generally lies within the range from $-100°$ C. to $+100°$ C. and preferably between $-80°$ C. and $+40°$ C.

The catalyst complexes used in this invention can be separately prepared according to the description given in the literature quoted hereinabove, and then added at very low temperatures to the solvent and the monomer, or they can be prepared directly in the presence of the monomer and the solvent, still at a low temperature; in both cases the whole is then brought slowly to the polymerization temperature.

Some embodiments of the present invention are described below:

*Example 1*

Into a glass flask perfectly dry and cooled to $-70°$ C. in Dry Ice, there are introduced 7 millimoles of anhydrous pyridine and 7 millimoles of $B_2H_6$. After a few hours, there are added to the $B_2H_6 \cdot C_5H_5N$ complex thus formed 10 cc. of anhydrous n-heptane and 10 g. of vinyl chloride, still at $-70°$ C., and under a nitrogen atmosphere. The flask is sealed in a flame and then the contents are stirred keeping the temperature at $-20°$ C. After 6 hours 6 g. of polymer are obtained.

*Example 2*

Into a perfectly dry glass flask cooled to $-70°$ C. in Dry Ice, there are introduced 14 millimoles of $NH_3$ and 7 millimoles of $B_2H_6$. After a few hours, still at $-70°$ C., and under a nitrogen atmosphere, there are added 10 cc. of anhydrous n-heptane and 10 g. of vinyl chloride to the $B_2H_6 \cdot 2NH_3$ complex thus formed. The flask is sealed in a flame and then the contents are stirred keeping the temperature at $-20°$ C. After 6 hours 6 g. of polymer are obtained.

*Example 3*

Into a perfectly dry flask cooled to $-70°$ C. in Dry Ice, there are introduced 14 millimoles of $PH_3$ and 7 millimoles of $B_2H_6$. After a few hours there are added 10 cc. of anhydrous n-heptane and 10 g. of vinyl chloride to the $B_2H_6 \cdot 2PH_3$ complex thus formed, still at $-70°$ C., and under a nitrogen atmosphere. The flask is sealed in a flame and then the contents are stirred keeping the temperature at $-20°$ C. After 6 hours 4 g. of polymer are obtained.

*Example 4*

Into a perfectly dry flask cooled to $-70°$ C. in Dry Ice, there are introduced 14 millimoles of anhydrous ethyl ether and 7 millimoles of $B_2H_6$. After a few hours there are added to the complex thus formed, still at $-70°$ C., and under a nitrogen atmosphere, 10 cc. of anhydrous n-heptane and 10 g. of vinyl chloride. The flask is sealed in a flame and then the contents are stirred keeping the temperature at $-20°$ C. After 6 hours 7 g. of polymer are obtained.

*Example 5*

Into a small, perfectly dry autoclave under a nitrogen atmosphere and cooled to $-30°$ C., there are introduced, in succession, 100 cc. of anhydrous n-heptane, 5.7 cc. of anhydrous tetrahydrofuran (0.07 mole), 2 g. of $B_2H_6$ (0.07 mole) and 100 g. of vinyl chloride. The autoclave is closed and stirred by means of a shaking device, keeping the temperature at $-20°$ C. After 6 hours the autoclave is opened and the polymer is removed. After drying, the resultant polymer is found to weigh 62 g.

*Example 6*

Proceeding as in Example 5, there are introduced into the autoclave 100 cc. of anhydrous n-heptane, 14.5 cc. of anhydrous ethyl ether (0.14 mole), 2 g. of $B_2H_6$ (0.07 mole) and 100 g. of vinyl chloride. After 6 hours at $-20°$ C. 60 g. of polymer are obtained.

*Example 7*

Proceeding as in Example 5, there are introduced into the autoclave 100 cc. of anhydrous n-heptane, 14 g. of triethylamine (0.14 mole), 2 g. of $B_2H_6$ (0.07 mole) and 100 g. of vinyl chloride. After 6 hours at $-20°$ C. 48 g. of polymer are obtained; the molecular weight determined osmometrically is 43,000.

*Example 8*

Proceeding as in Example 5, there are introduced into the autoclave 100 cc. of anhydrous n-heptane, 14.5 cc. of anhydrous ethyl ether (0.14 mole), 2 g. of $B_2H_6$ (0.07 mole) and 100 g. of styrene. After 8 hours at $-10°$ C., 50 g. of polymer are obtained.

*Example 9*

Proceeding as in Example 5, there are introduced into the autoclave 100 cc. of anhydrous n-heptane, 14.5 cc. of anhydrous ethyl ether (0.14 mole), 2 g. of $B_2H_6$ (0.07 mole) and 100 g. of methyl methacrylate. After 8 hours at $-10°$ C., 68 g. of polymer are obtained.

*Example 10*

Proceeding as in Example 5, there are introduced into the autoclave 100 cc. of anhydrous n-heptane, 15.2 cc. of acetone (0.14 mole), 2 g. of $B_2H_6$ (0.07 mole) and 100 g. of methyl methacrylate. After 8 hours at $-10°$ C., 75 g. of polymer are obtained.

*Example 11*

Proceeding as in Example 5, there are introduced into the autoclave 100 cc. of anhydrous n-heptane, 14.5 cc. of anhydrous ethyl ether (0.14 mole), 2 g. of $B_2H_6$ (0.07 mole) and 100 g. of acrylonitrile. After 8 hours at $-10°$ C., 15 g. of polymer are obtained.

*Example 12*

Proceeding as in Example 5, there are introduced into the autoclave 100 cc. of anhydrous n-heptane, 1.2 g. of ammonia gas (0.07 mole), 3.9 g. of $B_2(CH_3)_2H_4$ (0.07 mole) and 100 g. of vinyl chloride. After 6 hours at $-20°$ C., 58 g. of polymer are obtained.

*Example 13*

A one litre autoclave, previously dried and washed with nitrogen, is charged, in succession, with 0.3 g. of $B_2H_6$ (0.011 mole), 0.5 g. of methyl ether and 260 cc. of anhydrous n-heptane. Ethylene is introduced until a pressure of 60 atmospheres at $25°$ C. is obtained. The contents are heated to $50°$ C. and the pressure rises to 160 atmospheres. After 10 hours there is a pressure drop of 30 atmospheres, the autoclave is vented and the resultant polymer is discharged. After drying the yield of polymer is found to be 30 g.

It will be understod that the first component (*a*) of the co-ordination linkage according to the invention may be a diborane or alkyl derivatives of diborane, whereas the second component (*b*) may be a compound or combination of more compounds capable of donating electrons and selected from the group consisting of pyridine bases, ammonia, amines, ethers, thioethers, ketones, furan, and its derivatives, pyran and its derivatives, phosphines, arsines, stibines and bismuthines.

It will be further understood that in the second component (*b*) the element of Group V or Group VI of the Periodic Table which is capable of donating electrons to the boron atom to provide the co-ordination complex compound is linked to organic radicals or to substitutive hydrogens.

We claim:
1. A process for polymerizing a monomer having a double-bond ethylenic linkage, of the general formula:

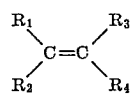

wherein, $R_1$, $R_2$, $R_3$ and $R_4$ are selected from the group consisting of hydrogen, saturated hydrocarbon radicals, ethylenically unsaturated hydrocarbon radicals, halogens, nitrile groups, free carboxyl groups, and acylic groups, halogen-substituted hydrocarbon radicals, comprising the step of initially forming a stable catalyst constituted of a complex organic boron compound, the complex comprising a co-ordination linkage of a first component selected from the group consisting of boron hydride and boron lower-akyl hydrides with a second component consisting of a compound containing an electronegative element selected from the group consisting of electron-donating elements of subgroup *b* of Group V and Group VI of the Mendeléeff Periodic Table, capable of donating electrons to the boron atom to provide the co-ordination complex compound by combining said components at a temperature below about $0°$ C.; and thereafter polymerizing said monomer in the presence of said stable catalyst.

2. A process according to claim 1, wherein said second component is a compound selected from the group consisting of pyridine bases, ammonia, amines, ethers, thioethers, ketones, furan and its derivatives, pyran and its derivatives, phosphines, arsines, stibines and bismuthines.

3. A process according to claim 2, wherein monomer is selected from the group which consists of acrylonitrile, styrene, acrylates, and methacrylates.

4. A process for polymerizing vinyl and vinylidene monomers comprising the step of: polymerizing the monomer in the presence of a catalyst constituted of a complex boron compound, the complex comprising a co-ordination linkage of
a first component selected from the group consisting of a boron hydride and a boron lower-alkyl hydride with
a second component consisting of a compound containing an electronegative element selected from the group consisting of electron-donating elements of subgroup b of Group V and Group VI of the Mendeléeff Periodic Table.

5. A process according to claim 4, wherein said second component is a compound selected from the group consisting of pyridine bases, ammonia, amines, ethers, thioethers, ketones, furan and its derivatives, pyran and its derivatives, phosphines, arsines, stibines and bismuthines.

6. A process according to claim 4, wherein said first component is selected from the group which consists of diborane and lower-alkyl-substituted diborane.

7. A process according to claim 4, wherein said element of the second component is nitrogen.

8. A process according to claim 5, wherein the second component is selected from the group which consists of ammonia, tertiary aliphatic amines and triethylamine.

9. A process according to claim 5, wherein the second component is a heterocyclic compound, containing a tertiary nitrogen atom.

10. A process according to claim 5, wherein the second component is pyridine.

11. A process according to claim 4, wherein said element of the second component is oxygen.

12. A process according to claim 11, wherein the second component is an ether.

13. A process according to claim 4, wherein the second component is a dialkyl ether.

14. A process according to claim 13, wherein the second component is diethyl ether.

15. A process according to claim 11, wherein the second component is a heterocyclic compound containing an oxygen atom.

16. A process according to claim 4, wherein the second component is tetrahydrofuran.

17. A process according to claim 11, wherein the second component is a ketone.

18. A process according to claim 17, wherein the second component is an aliphatic ketone.

19. A process according to claim 4, wherein the second component is acetone.

20. A process according to claim 4, wherein said element of the second component is phosphorus.

21. A process according to claim 20, wherein the second component is phosphine.

22. A process according to claim 4, wherein the catalyst complex is prepared at a temperature below 0° C.

23. A process according to claim 4, wherein the polymerizing step is carried out in the presence of an inert hydrocarbon as solvent.

24. A process according to claim 4, wherein the polymerizing step is carried out in the presence of a polar solvent selected from the group consisting of water, an ether, acetone, an ester, tetrahydrofuran, saturated and unsaturated hydrocarbons.

25. A process according to claim 4, wherein said monomer is vinyl chloride.

26. A process according to claim 4, wherein said monomer is vinyl acetate.

27. A process according to claim 4, wherein the polymerizing step is carried out at a pressure below 10 atmospheres and at a temperature within the range −100° C. to +100° C.

28. A process for polymerizing a monomer having a single double-bond ethylenic linkage of the general formula:

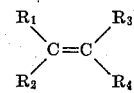

wherein $R_1$, $R_2$, $R_3$ and $R_4$ are selected from the group consisting of hydrogen, saturated hydrocarbon radicals, ethylenically unsaturated hydrocarbon radicals, halogens, nitrile groups, free-carboxyl groups, acylic groups and halogen-substituted hydrocarbon radicals, said monomer being selected from the group which consists of acrylonitrile, styrene, acrylates, methacrylate, vinyl chloride and vinyl acetate, comprising the steps of initially preparing a stable catalyst constituted of a complex organic boron compound, the complex comprising a co-ordination linkage of a first component selected from the group consisting of boron hydride and boron lower-alkyl hydrides with a second component consisting of a compound containing an electronegative element selected from the group which consists of nitrogen, oxygen, phosphorus, arsenic, antimony and bismuth in an electron-donor state, said element having at least one pair of unbound electrons adapted to form a co-ordination complex with the boron atom of said first component, by combining said components at a temperature below about 0° C.; and thereafter polymerizing said monomer in the presence of said stable catalyst.

29. A process for polymerizing a monomer having a single double-bond ethylenic linkage of the general formula:

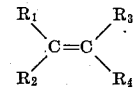

wherein $R_1$, $R_2$, $R_3$ and $R_4$ are selected from the group consisting of hydrogen, saturated hydrocarbon radicals, ethylenically unsaturated hydrocarbon radicals, halogens, nitrile groups, free-carboxyl groups, esterified-carboxyl groups, acrylic groups and halogen-substituted hydrocarbon radicals, said monomer being selected from the group which consists of acrylonitrile, styrene, acrylates, methacrylate, vinyl chloride and vinyl acetate, comprising the steps of initially producing a catalyst constituted of a complex organic boron compound, the complex comprising a co-ordination linkage of a first component selected from the group consisting of boron hydride and boron lower-alkyl hydrides with a second component consisting of a compound containing an electronegative element selected from the group which consists of nitrogen, oxygen, phosphorus, arsenic, antimony and bismuth in an electron-donor state, said element having at least one pair of unbound electrons adapted to form a co-ordination complex with the boron atom of said first component, said second component being a compound selected from the group which consists of pyridine bases, ammonia, amines, ethers, thioethers, ketones, furan, furan derivatives, pyran, pyran derivatives, phosphenes, arsenes, stibines and bismuthines, by combining said components at a temperature below about 0° C.; and thereafter polymerizing said monomer in the presence of said stable catalyst.

(References on following page)

References Cited by the Examiner

UNITED STATES PATENTS

| | | | |
|---|---|---|---|
| 2,112,298 | 3/1938 | Welch | 260—92.1 |
| 2,566,184 | 8/1951 | Fowler et al. | 260—85.7 |
| 2,566,382 | 9/1951 | Sweet et al. | 260—440 |
| 2,765,296 | 10/1956 | Strain | 260—85.7 |
| 2,840,551 | 6/1958 | Field et al. | 260—94.9 |
| 2,950,306 | 8/1960 | Smith | 260—440 |
| 2,989,516 | 6/1961 | Schneider | 260—88.2 |
| 3,004,017 | 10/1961 | Cash | 260—93.7 |
| 3,057,843 | 10/1962 | Farhat et al. | 260—94.9 |

OTHER REFERENCES

Furukawa et al.: Journal of Polymer Science, vol. 28, pages 227–9 (1958).

Ashikari: Journal of Polymer Science, vol. 28, pages 641–2 (1958).

JOSEPH L. SCHOFER, *Primary Examiner.*

HAROLD BURSTEIN, JOSEPH R. LIBERMAN, WILLIAM H. SHORT, *Examiners.*

J. F. McNALLY, *Assistant Examiner.*